United States Patent [19]

Peters

[11] 4,398,217

[45] Aug. 9, 1983

[54] METHOD OF AND ARRANGEMENT FOR DIGITIZING A TIME-DISCRETE VIDEO SIGNAL USING A PICTURE TRANSFORM CODING

[75] Inventor: Joseph H. Peters, Eindhoven, Netherlands

[73] Assignee: U.S. Philips Corporation, New York, N.Y.

[21] Appl. No.: 278,235

[22] Filed: Jun. 29, 1981

[30] Foreign Application Priority Data

Apr. 7, 1980 [NL] Netherlands .......................... 8003873

[51] Int. Cl.$^3$ .............................................. H04N 7/12
[52] U.S. Cl. .................................... 358/138; 358/133; 382/56
[58] Field of Search ................ 358/133, 138; 364/515, 364/725, 727

[56] References Cited

U.S. PATENT DOCUMENTS 3,984,626  10/1976  Mounts et al. ....................... 358/133
4,179,709  12/1979  Workman ............................. 358/133

OTHER PUBLICATIONS

Limb et al.-Digital Differential Quantizer For Television-vol. 48 1969, pp. 2583-2599.
Chen et al.-Adaptive Coding of Monochrome and Colour Images IEEE Trans on Comm.-vol. Com. 25-No. 11-Nov. 1977-pp. 1285-1292.
Wintz-Transform Picture Coping-Proc of IEEE-vol. 60-No. 7, Jul. 1972-pp. 809-820.
TTL Data Book, Texas Instruments-No. LCC 4112-the IC Tyne No. Sn 74 LS 148.
Fukunuki et al.-Intraframe Image Coding by Cascaded Hadaward Transforms-vol. Com-21, No. 3, Mar. 1973, pp. 175-180.
Special Issue on Analog Digital Conversion-IEEE Trans on Circuits and Systems-vol. Cas-25-No. 7, Jul. 1978.
CCITT Recommendation G-751-vol. III-2, pp. 469-477.

*Primary Examiner*—Joseph A Orsino, Jr.
*Attorney, Agent, or Firm*—Thomas A. Briody; William J. Streeter; Laurence A. Wright

[57] ABSTRACT

A method of and arrangement for digitizing a video signal using a picture transform coding, wherein a group of N video signal samples is converted into a group of N coefficients y(m) wherein m=1, 2, 3, ... N which are each adaptively encoded.

In order to prevent a coefficient y(m) which is on average small to very small, from being insufficiently accurately encoded, or not encoded at all, when it is occasionally large, the group of coefficients is compared with a number of fixed classification groups A(j) each consisting of M elements a(j,m), wherein a(j+1,m)$\geq$a(j,m) and j=1, 2, 3, ... M. The j is determined in such manner that y(m)<a(j,m) for all m.

A bit-assignment group B(j) having elements b(j,m) is associated with each classification group A(j) and each one of the N coefficients y(m) is now converted into a code word z(m) which contains a number of bits which is characterized by b(j,m) and which is, for example, equal to the value of b(j,m).

7 Claims, 14 Drawing Figures

| M=4 | Y[A(1)] | Y[A(2)] | Y[A(3)] | Y[A(4)] |
|---|---|---|---|---|
| y(1) | 9 | 6 | 6 | 5 |
| y(2) | 3 | 2 | 3 | 3 |
| y(3) | 4 | 4 | 4 | 3 |
| y(4) | 4 | 3 | 3 | 3 |
| y(5) | 3 | 3 | 3 | 3 |
| y(6) | 0 | 2 | 2 | 2 |
| y(7) | 0 | 0 | 0 | 2 |
| y(8) | 0 | 0 | 0 | 0 |
| y(9) | 4 | 4 | 4 | 4 |
| y(10) | 0 | 2 | 2 | 2 |
| y(11) | 3 | 2 | 2 | 2 |
| y(12) | 2 | 2 | 2 | 2 |
| y(13) | 4 | 4 | 3 | 3 |
| y(14) | 0 | 2 | 2 | 2 |
| y(15) | 2 | 2 | 2 | 2 |
| y(16) | 0 | 0 | 0 | 0 |

FIG.14

METHOD OF AND ARRANGEMENT FOR DIGITIZING A TIME-DISCRETE VIDEO SIGNAL USING A PICTURE TRANSFORM CODING

A. BACKGROUND OF THE INVENTION

A(1) Field of the Invention

The invention relates to a method of digitizing a time-discrete video signal using a picture transform coding and an adaptive variable word length coding, this time-discrete video signal being converted into a digital signal whose components comprise unequal numbers of bits.

The invention also relates to an arrangement for carrying out this method.

A(2) Description of the Prior Art

Over the years there has been an increasing interest in digitizing analog information signals. To that end an analog-to-digital converter is usually used which converts an analog information signal into a digital signal consisting of a sequence of components or code words, each comprising a number of bits. Embodiments of analog-to-digital converters are described in reference 1 (see paragraph D). The digital signal produced by an analog-to-digital converter, and consisting of a sequence of components or code words each comprising a number of bits may also be considered as a data signal consisting of a sequence of bits having either the value "0" or the value "1". Compared with analog signals, such data signal have the considerable advantage that noise superimposed on them during transmission can be removed, as a result of the fact that the bits of such data signals can be regenerated. This accomplishes a considerable improvement of the signal-to-noise ratio. For these reasons speech signals have already been digitized for quite some time in telephony systems before they are transmitted, particularly when this transmission is to be effected over long distances.

When video signals have to be transmitted over long distances, or when they have to be stored in a storage medium, it would also be advantageous to digitize these video signals. A disadvantage of a digital video signal is the enormous number of bits required to represent one full TV-picture. For a straight-forwardly digitized colour television signal this number is approximately $5 \cdot 10^6$ bits.

If such a digital video signal were transmitted over an existing transmission line in a telephony system it would require a bit rate of approximately 120 Megabits per second, and an excess demand would be made on the capacity of this transmission line. In this respect the CCITT (see reference 2) now dictates that a digital video signal may be transmitted over a transmission line in a telephony system only when the bit rate of this digital video signal does not exceed 34 Megabits per second. This means that the original bit rate and, consequently, also the number of bits per TV-picture must be reduced by a factor of approximately four without, of course, much loss in picture quality.

Several methods have already been described for this reduction. These methods are all based on reducing the redundancy in the video signal. These methods may be divided into two categories. The first category comprises those methods in which a sample of the video signal is not coded in its entirety, but each time only the difference between two consecutive video signal samples. This method is called differential pulse code modulation, DPCM for short. This method can be realized with comparatively simple equipment and furnishes good results, provided no greater reduction of the number of bits per TV-picture is required than a factor of three (see, for example, reference 3). The second category, with which a larger reduction of the number of bits per TV-picture can be obtained, includes methods involving the so-called picture transforms for which the TV-picture is divided into a large number of usually square subpictures, each subpicture thereafter being "series developed", that is to say considered as a sum of a number of mutually orthogonal basic pictures, each having its own weight factor. These weight factors are coded instead of the video signal samples themselves.

In practice the said subpictures are obtained by combining a number of video signal samples, which either belong all to the same video line or to different video lines, into a group which is denoted a video group hereinafter, and has a finite number of elements $x(n)$, wherein $n = 1,2,3, \ldots N$. As mentioned before each element $x(n)$ represents a video signal sample. Thereafter this video group is converted into a group of coefficients consisting of the N coefficients $y(m)$, the relationship between a coefficient $y(m)$ and the N elements $x(n)$ of a video group being given by the expression:

$$y(m) = \sum_{n=1}^{N} h(m,n)x(n)$$

where $m = 1,2,3, \ldots N$. In this expression $h(m,n)$ is a constant and may be considered as an element of a $N \times N$ matrix H. Each coefficient $y(m)$ represents one of the above-mentioned weight factors.

It will be clear that if all these coefficients were coded with the same degree of accuracy as the original video signal samples, so requiring the same number of bits, no reduction of the number of bits per TV-picture would be obtained. In order to realize such a bit reduction the transform matrix H is chosen in such manner that the coefficients $y(m)$ are more independent from each other than the video signal samples $x(n)$. The transform matrices most frequently used in this connection are the Hotelling, the Fourier, the Hadamard and the Haar matrices (see, for example, references 4 and 5).

The coefficients obtained by means of this transform can be coded in two different ways, namely non-adaptively or adaptively. A non-adaptive coding of these coefficients is described in reference 4 and is there denoted "Zonal filtering" or "Masking", in which not all the coefficients are coded and transmitted or stored, but only a fixed number of predetermined coefficients. Which particular coefficients are used is not determined by the picture itself but by "all" pictures to be coded. Extensive research has shown that the absolute value of certain coefficients is small to very small on an average, while other coefficients have an absolute value which is on an average above a given value. Those coefficients whose absolute value is on an average less than a predetermined threshold value are now never coded, while the others always are. This may be interpreted as follows: each coefficient is converted into a code word having a number of bits which is characteristic of the relevant coefficient. In other words, a number $b(m)$ which indicates the number of bits into which the coefficient $y(m)$ must be coded, may be assigned to each coefficient $y(m)$. These numbers $b(m)$ may be considered to be the elements of a group B, which will be denoted a bit assignment group hereinafter. In the non-adaptive coding considered here those numbers b(m), which are assigned to those co-efficients y(m) which must not be coded, are equal to zero. Further, in this special case, b(m) becomes smaller when the above-mentioned average value of the coefficient to which this number b(m) is assigned, reduces.

Reference 4 also describes an adaptive coding of the coefficients y(m), which is called "threshold sampling" there. Also in this case not all of the coefficients are coded, but only certain selected ones. Which coefficients must be coded and how many is now determined by the picture to be encoded. These coefficients which have an instantaneous absolute value which is greater than a predetermined threshold value are now coded. As now it is not known in advance which coefficients will be coded, information about the index m of the coded coefficient must now also be generated. Also now it may be assumed that a fixed bit-assignment group B is associated with the group of coefficients, whereby those numbers b(m) assigned to those coefficients y(m) which must not be coded now are made equal to zero.

Reference 5 describes an alternative adaptive coding of the coefficients. In this case the "picture activity" of a subpicture is determined, that is to say a quantity E is calculated which either satisfies the equation:

$$E = \sum_{m=2}^{N} (y^2(m) - y^2(1))$$

or the equation:

$$E = \sum_{m=2}^{N} |y(m)|$$

Thereafter the value of E obtained in this way is compared with a number of threshold values D(1), D(2) . . . and it is determined between which threshold values or in which interval E is located. Now, a one bit-assignment group B(j) of a number of bit assignment groups j=1,2,3 . . . is associated with each interval. More particularly, with the interval $E \leq D_1$, for example there is associated the bit assignment group B(1), the bit-assignment group B(2) is associated with the interval $D_1 < E \leq D_2$, and the bit-assignment group B(3) is associated with the interval $D_2 < E \leq D_3$, etc. These bit-assignment groups B(j) are characterized in that several elements b(j,m) will have the value zero, while an element b(j,m) differing from zero need not be equal to the non-zero element b(i,m) for i unequal to j.

It should be noted that generally both a linear and a non-linear coding characteristic may be used for the coding of a coefficient y(m).

B. SUMMARY OF THE INVENTION

As mentioned already in paragraph A(1), the invention relates to a method of digitizing a time-discrete video signal using a picture transform coding and an adaptive variable word length coding, this time-discrete video signal being converted into a digital signal whose components comprise unequal numbers of bits. With such a method the number of bits per picture or the average number of bits per picture is reduced compared with a direct digitizing of the video signal. From the previous discussion of prior art it is apparent that such a method generally comprises the following steps:

(a) composing a video group consisting of a finite number of N video signal samples x(n);

(b) transforming this video group into a group of coefficients consisting of N coefficients y(m), which are each equal to the sum of weighted versions of the video signal samples x(n) of the video group and wherein n,m = 1,2,3, . . . N, (c) adaptive coding of each of the coefficients y(m) of the group of coefficients.

The adaptive coding methods described in the preceding paragraphs all have the disadvantage that when a given coefficient, which is on an average small to very small, is incidently relatively large, this coefficient is nevertheless not coded or coded with an insufficient accuracy. This means that fine details of the relevant subpicture will be lost, so that picture quality is reduced.

It is an object of the present invention, to counteract this loss of detail.

According to the invention the following substeps are taken for the adaptive coding of each of the coefficients y(m) of the group of coefficients:

I(1). comparing the absolute value of the group of coefficients with a number of classification groups A(j) wherein j= 1, 2,3, . . . M, each consisting of the positive elements a(j,m) and the order j being assigned to this group A(j) and $a(j+1,m) \geq a(j,m)$, while a bit-assignment group B(j) consisting of the positive elements b(j,m) is associated with each classification group A(j);

I(2). selecting the classification group A(j) of the least possible order for which it holds that for each value of m the absolute value of y(m) is smaller than a(j,m);

I(3). converting the absolute value of each of the coefficient y(m) into a coefficient code word z(m) which comprises a number of bits characterized by the element b(j,m) of the bit-assigned group B(j) associated with the selected classification group A(j);

I(4). generating an order code word R(j) which characterizes the order of the selected classification group A(j).

C. BRIEF DESCRIPTION OF THE DRAWINGS

In order that the invention may be more fully understood, reference will now be made by way of example to the accompanying drawing wherein.

D. REFERENCES

1. Special Issue on Analog Digital Conversion; IEEE Transactions on Circuits and Systems, Vol. CAS-25, No. 7, July 1978.
2. CCITT Recommendation G-751 (1977);
3. Digital Differential Quantizer for Television; J. O. Limb, F. W. Mounts; Bell Systems Technical Journal, Vol. 48, 1969, pages 2583-2599.
4. Transform Picture Coding; P. A. Wintz; Proceedings of the IEEE, Vol. 60, No. 7, July 1972, pages 809-820.
5. Adaptive Coding of Monochrome and Colour Images; W. H. Chen, C. H. Smith; IEEE Transactions on Communications; Vol. COM-25, No. 11, November 1977, pages 1285-1292.
6. Philips Data handbook, Signetics integrated circuits 1976; or the TTL Data Book, Texas Instruments no. LCC 4112; the IC type no. SN 74 LS 148.
7. Intraframe Image Coding by Cascaded Hadamard Transforms; T. Fukunuki, M. Miyata; IEEE Transactions on Communications, Col. COM-21, No. 3, March 1973, pages 175-180.

E. GENERAL STRUCTURE OF THE CODING ARRANGEMENT

Figure 1:
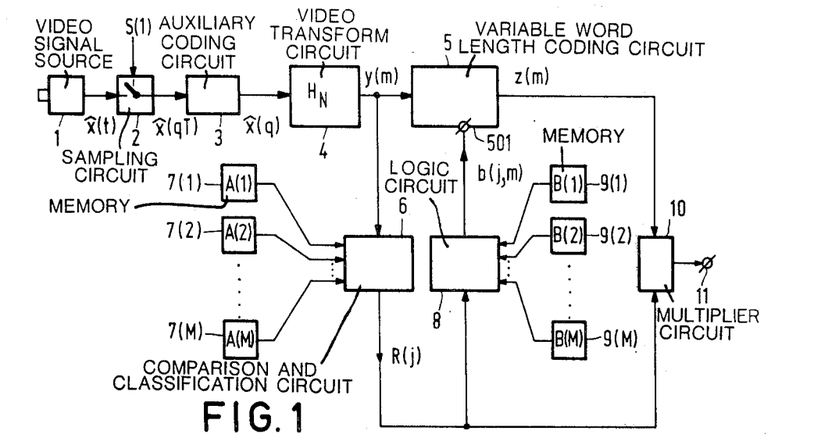
FIG. 1 shows the general structure of a coding arrangement using picture transform coding.

FIG. 1 shows a coding arrangement whose structure is based on the method according to the invention, described in the foregoing. A video signal $\tilde{x}(t)$ which is obtained from a video signal source 1 is applied to this coding arrangement. In the embodiment to be described this video signal is applied to a sampling circuit 2 which, in response to sampling pulse S(1) which occur at a rate $f_s = 1/T$, takes samples from this video signal and produces the video signal samples $x(\tilde{q}T)$, it holding that q = ... −2, −1, 0, 1, 2, .... These video signal samples are thereafter quantized in an auxiliary coding arrangement 3 and encoded linearly. Thus, the auxiliary coding arrangement 3 produces numbers x(q) each representing a quantized and linearly coded version of a video signal sample x(qT).

The video signal sample numbers $x(\tilde{q})$ are applied to a transform arrangement 4, to be described, which:

(1) groups these signal sample numbers and thus composes a video group consisting of the N elements x(n) which each represent a video signal sample and wherein n = 1, 2, 3, ... N;

(2) transforms this video group into a group of coefficients consisting of the N coefficients y(m), wherein m = 1,2,3, ... N, and the relationship between these coefficients and the elements of the video group being given by the expression $$y(m) = \sum_{n=1}^{N} h(m,n)x(n)$$

As mentioned in the foregoing, the constants h(m,n) may be considered as elements of a transform matrix H. Hereinafter this will be expressed by assuming that a transform matrix is associated with the transform arrangement.

The transform arrangement 4 now produces at its output these coefficients y(m), which are applied to a variable word length coding arrangement 5 which converts each coefficient into a code word z(m) having a suitable word length. This word length is determined by a quantity which is applied to this coding arrangement 5 via a control input 501.

The coefficients y(m) are not only applied to the variable word length coding arrangement 5 but also to a comparison and classification circuit 6. A number M of memories 7(1), 7(2), ... 7(M), are connected to this circuit. Each of these memories stores a classification group. More particularly, as shown in the Figure, the memory 7(1) contains the classification group A(1), of the order one; the memory 7(2) contains a classification group A(2) of the order two; etc. Each of these classification groups consists of N positive elements. When the classification group of the order j is now represented by A(j), wherein j = 1, 2, ... N, an element of this group may be represented by a(j,m). The element of the classification group has now been chosen in such a way that $a(j+1,m) \geq a(j,m)$.

In the circuit 6 the absolute values of the group of coefficients are now compared with the classification groups, that is to say the absolute value of a coefficient y(m) of a group of coefficients is compared with one or more of the elements a(1,m),a(2,m), a(M,m). On the basis of this comparison the lowest value of j can then be determined and consequently that classification group A(j) can be selected which is of the lowest possible order for which it holds that the absolute value of y(m) is smaller than a(j,m) for all values of m. This number j, or an equivalent thereof, denoted order-code word R(j) hereinafter, is now applied to a logic circuit 8.

Connected to this logic circuit 8 there are also a number M of memories 9(1), 9(2), ... 9(M), which number is equal to the number of classification groups A(.). A bit-assignment group is stored in each of the memories 9(.). As indicated in the Figure, the memory 9(1) contains the bit-assignment group B(1); the memory 9(2) contains the bit-assignment group B(2); etc. Each of the bit-assignment groups consists of N bit-assignment elements. When the bit-assignment group having number j is indicated by B(j), wherein j = 1, 2, ... M, then each bit-assignment element of that group may be represented by b(j,m). In response to the order-code word R(j) the bit-assignment elements b(j,m) of the group B(j) are applied to the variable word length coding arrangement 5, in response to which the coefficient y(m) is converted into a code word z(m) whose number of bits is determined by b(j,m).

As will be apparent from the above, one specific bit-assignment group B(j) is associated with one specific classification group A(j). In such cases it is said that a bit-assignment group B(j) is associated with the classification group A(j).

As the word length of a code word z(m) is determined by the group of coefficients, this method is called adaptive variable word length coding.

The code words z(m) thus obtained and the order-code word R(j) associated with a group of coefficients may now each be applied either individually, or in a time-division multiplex format to a common transmission medium. The latter case will require a multiplex circuit 10, which may, however, be constructed in a conventional manner and whose output is connected to the output 11 of the coding arrangement.

F. DETAILED CONSTRUCTION OF SOME COMPONENTS

F(1). The transform arrangement

Figure 2:
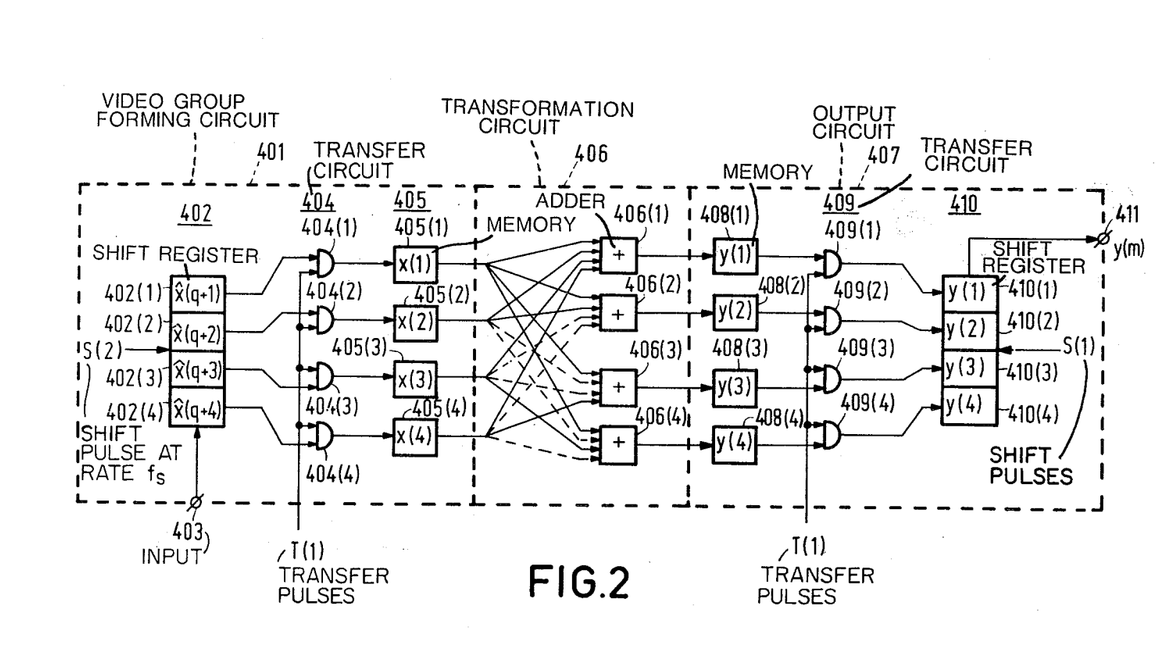
FIG. 2 shows an embodiment of a transform arrangement.

FIG. 2 shows an embodiment of a transform arrangement with which a 4×4 Hadamard transform matrix $H_4$ is associated and wherein the video group consists of 4 consecutive video signal samples which all belong to the same video line. These video signal samples $\tilde{x}(q)$ are applied sequentially to this transform arrangement and this transform arrangement produces the four coefficients y(m), also sequentially.

More particularly, the transform arrangement shown in FIG. 2 comprises a video group-forming circuit 401, comprising a shift register 402, a transfer circuit 404 and a memory 405. The shift register 402 consists of the four shift register elements 402(1)–402(4), each arranged for storing a signal sample $\tilde{x}(q)$. This shift register has an input 403 which is connected to the output of the auxiliary coding arrangement 3. Shift pulses S(2), which occur at a rate $f_s$ are further applied to this shift register. The outputs of these shift register elements 402(.) are connected in the manner shown in the Figure to inputs of memory elements 405(.) of the memory 405 by means of the transfer circuit 404 comprised of AND-gate circuits 404(.). Transfer pulses T(1) which occur with a period of $4/f_s = 4T$ are applied to these AND-gate circuits 404(.). When now at the instant a transfer pulse T(1) occurs the shift register element 402(n) contains the video signal sample $\tilde{x}(q+n)$ then this video signal sample is written into the memory element 405(n) of the memory 405 and is the denoted x(n). The four elements x(n) present in this memory 405 after the occurrence of the transfer pulse T(1) now form the above-mentioned video group which is transformed in a transformation circuit 406. To this end the outputs of the memory elements 405(.) are connected in the manner shown in the Figure to inputs of adders 406(.) of the transformation circuit 406, which produce the desired coefficients y(.). More particularly, a solid line between a memory element 405(.) and an adder 406(.) indicates that the relevant element x(.) multiplied by a factor of +1 is appled to the relevant adder, while a dotted line indicates that the relevant element x(.) multiplied by a factor of −1 is applied to the relevant adder. The coefficients y(.) produced by the adders 406(.) are applied to an output circuit 407 and stored in memory elements 408 (.). By means of a transfer circuit 409 formed by AND-gate circuit 409(.) the outputs of these memory elements 408(.) are connected to setting-resetting inputs of the shift register elements 410(.) of a shift register 410. The transfer pulses T(1) are not only applied to the AND-gate circuits 404(.) but are also applied to the AND-gate circuits 409(.). In response to the shift pulses S(1) the coefficients stored in this shift register 410 are sequentially applied to the output 411 of the transform arrangement.

F(2). The comparison and classification circuit

Figure 3:
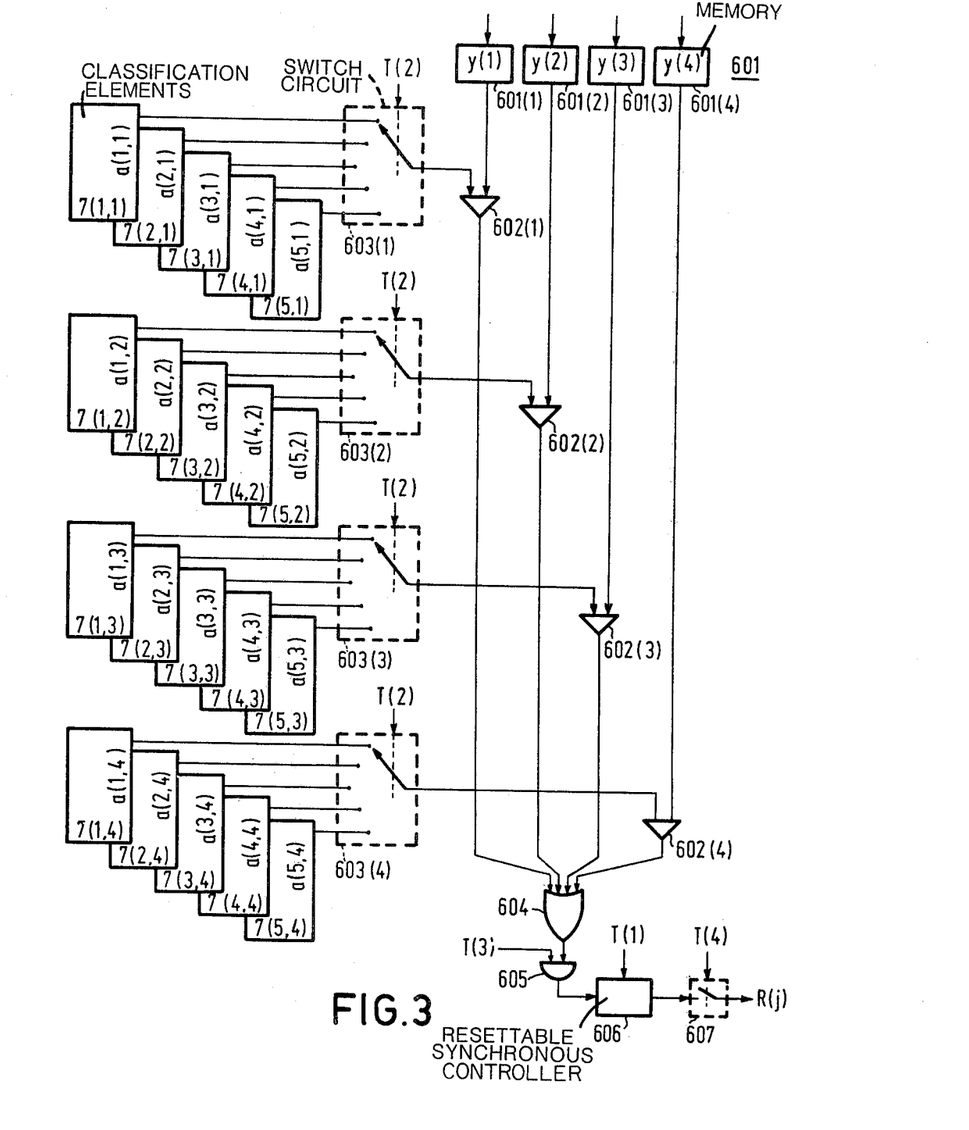
FIG. 3 shows an embodiment of a comparison and classification circuit.

FIG. 3 shows an embodiment of the comparison and classification circuit 6 for the case where M=5. It comprises a memory 601 which is comprised of memory elements 601(1), 601(2), 601(3), 601(4) containing the coefficients y(1), y(2), y(3) and y(4), respectively. For the purpose of regularly entering a new group of coefficients into this memory 601, these memory elements are connected to the outputs of the AND-gate circuits 409(.) of the transfer circuit 409 shown in FIG. 2. For m=1, 2, 3, 4 it now holds that the output of the memory element 601(m) containing the coefficient y(m) is connected to a first input of a comparison circuit 602(m). To a second input thereof there are applied M sequentially occurring classification elements a(1,m), a(2,m), a(3,m), a(4,m), a(5,m) and it produces a logic "1" each time the coefficient y(m) is greater than the classification element with which it is compared.

For applying the classification elements to the comparison circuit 602(m) the second input thereof is connectable via a switching arrangement 603(m), which is only shown symbolically in the Figure, to the outputs of M memory elements 7(1,m), 7(2,m), 7(3,m), 7(4,m) and 7(5,m), which contain the respective classification elements a(1,m), a(2,m), a(3,m), a(4,m) and a(5,m). This switching arrangement 603(m) is controlled in such manner by clock pulses T(2) that first a(1,m) than a(2,m), thereafter a(3,m), then a(4,m) and finally a(5,m) is applied to the second input of the comparison circuit 602(m).

The output of the comparison circuit 602(m) is connected to an input of an OR-gate circuit 604 the output of which is connected to a first input of an AND-gate 605. Clock pulses T(3) are applied to a second input of this AND-gate. The output of this AND-gate is further connected to an input of a resettable synchronous counter 606.

The comparison and classification circuit shown in FIG. 3 operates as follows. At the instant a transfer pulse T(1) is applied to the AND-gate circuits 409(.) of the transfer circuit 409 shown in FIG. 2, the content y(m) of the memory element 408(m) is transferred to the memory element 601(m) and counter 606 is reset to the zero position. As the switching arrangement 603(1), 603(2), 603(3) and 603(4) are synchronously controlled, the coefficients y(1), y(2), y(3) and y(4) are first compared with the classification elements a(1,1), a(1,2), a(1,3), a(1,4), respectively. When now at least one of these coefficients is greater than the classification element with which it is compared, OR-gate 604 produces a logic "1" and a clock pulse T(3) is applied to counter 606 via AND-gate 605, causing the counter position to be increased by one. Together the above-mentioned classification elements a(1,1) ... 1(1,4) form the above-mentioned classification group A(1).

After the group of coefficients has been compared with the first classification group A(1) a comparison with the second classification group A(2) takes place. In other words the coefficients y(1), y(2), y(3) and y(4) are compared with the respective classification elements a(2,1), a(2,2), a(2,3) and a(2,4). When also now at least one of the coefficients is greater than the classification element with which it is compared then a clock pulse T(3) is again applied to counter 606.

The above-described method is now repeated with the classification group A(3), the group A(4) and the group A(5).

If now, for a predetermined value of j, none of the comparison circuits 602(.) produces a logic "1", so that it holds for each m that: a(j,m)>y(m), then the counting position of counter 606 is equal to $R(j)=j-1$. This counting position can now be transferred to the logic circuit 8 shown in FIG. 1. This transfer is symbolically shown in FIG. 3 by a switch 607 which is controlled by transfer pulses T(4).

F(3). Logic circuit 8 and bit-allotting memory

Figure 4:
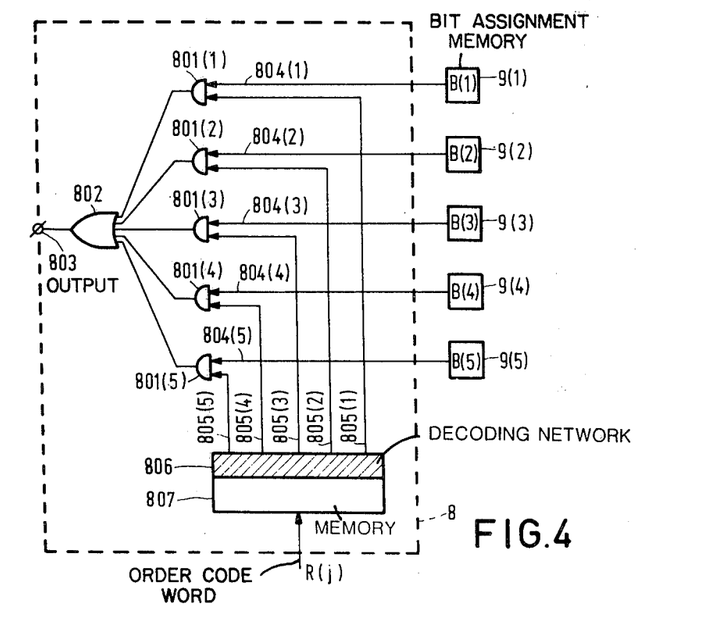
FIG. 4 shows an embodiment of a logic circuit.

As mentioned in the foregoing, the order code words R(j) are applied to the logic circuit for the purpose of selecting the bit-assignment group B(j) associated with the classification group A(j). FIG. 4 shows an embodiment suitable for this purpose of this logic circuit 8. It comprises (M=5) AND-gate circuits 801(.) which are each connected by means of an output to an input of an OR-gate circuit 802, the output 803 of which is connected to the input 501 of the variable word length coding arrangement 5 of FIG. 1.

Each AND-gate circuit 801(j) has two inputs, denoted by 804(j) and 805(j), respectively, and wherein j again represents a number from the sequence 1,2,3, ... M. The input 804(j) of AND-gte circuit 801(j) is connected to the output of the bit-assignment memory 9(j) and the input 805(j) is connected to a decoding network 806 which is connected to a memory 807. The order-code word R(j) which is obtained from the counter 606 shown in FIG. 3 is entered into this memory 807. In response to this code word the decoding network 806 produces a pulse having a duration which is, for example, approximately equal to the period of the pulse sequence T(4). More particularly, this pulse is produced at the input 805(1), if R(j)=0, so that j=1
805(2), if R(j)=1, so that j=2
805(3), if R(j)=2, so that j=3
805(4), if R(j)=3, so that j=4
805(5), if R(j)=4, so that j=5.

If this pulse occurs at the input 805(j), the bit assignment elements b(j,m), wherein m=1, 2, 3, 4, which have been stored in the bit-assignment memory 9(j), are sequentially applied to the variable word length coding arrangement 5 via AND-gate circuit 801(j) and OR-gate circuit 802.

Figure 5:
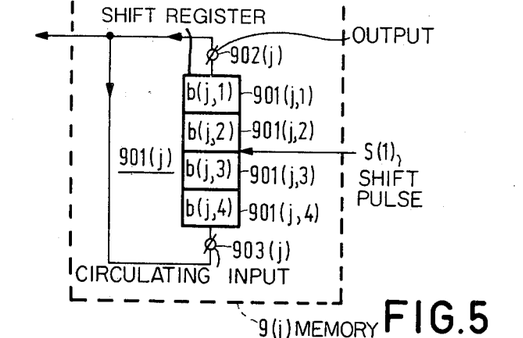
FIG. 5 shows an embodiment of a circulating shift register for storing bit-assignment elements.

In order to have the bit assignment elements b(j,m) occur sequentially, as is assumed in this embodiment, each memory 9(j) is preferably in the form of a circulating shift register. FIG. 5 shows a schematic embodiment of such a shift register. As indicated in this Figure this memory 9(j) comprises a shift register 901(j) having a total of N=4 shift register elements 901(j,m) each arranged for storing a bit assignment element b(j,m). The content of this register is shifted forward by the pulses S(1). The output 902(j) of this shift register is connected to the input 804(j) of AND-gate circuit 801(j). To realize the circulating character, the output 902(j) is also connected to an input 903(j) of this shift register 901(j).

F(4). The variable word length coding arrangement 5

Figure 6:
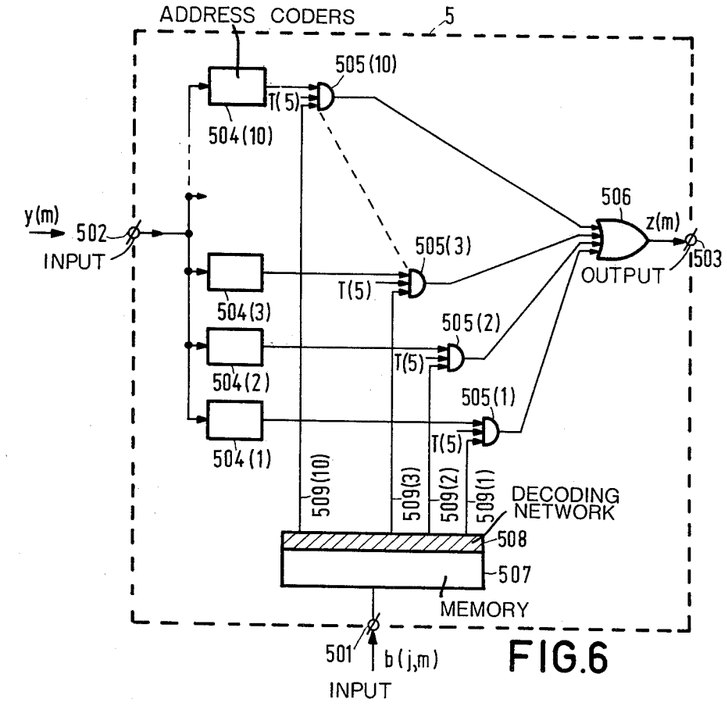
FIG. 6 shows an embodiment of a variable word length coding arrangement.

FIG. 6 shows an embodiment of the variable word length coding arrangement 5. The arrangement has the above-mentioned input 501, to which the bit-assignment elements b(j,m) are applied. It also has an input 502 to which the coefficients y(m) are applied and an output 503 at which the code words z(m) appear. A number of auxiliary coding arrangements, ten in this case, 504(1), 504(2) ... 504(10) are connected to the input 502. These auxiliary coding arrangements producing 504(2), ... 504(10), for example, 1-bit, 2-bit, 3-bit, ... 10-bit code words, respectively. The outputs of these auxiliary coding arrangements are connected to the output 503 via AND-gate circuits 505(.) and an OR-gate circuit 506. This arrangement 5 further comprises a memory 507 in which the bit-assignment elements b(j,m) are temporarily stored. A decoding network 508 having ten outputs 509(.) is connected to this memory. Each of these outputs is connected to an input of a respective AND-gate circuit 504(.). If an element b(j,m) is entered into the memory 507, a pulse is produced at a given output 509(i) of the decoding network 508. This pulse is applied to the AND-gate circuit 505(i) which is connected to this output, a clock signal T(5) also being applied to this AND-gate circuit. At the instant a pulse occurs in the clock signal T(5), the code word produced by the auxiliary coding arrangement 504(i) is applied to the output 503 as the output code word z(m).

It should be noted that in many cases the bit assignment element b(j,m) will represent the number i of the auxiliary coding arrangement 504(i) whose output code word must be applied to the output 503 as code word z(m). In the above-described embodiment i is also equal to the number of bits in z(m).

It should further be noted that the relationship between z(m) and y(m) may be a linear relationship; however, a non-linear relationship is alternatively possible.

As in the above-described embodiment the coefficients y(m) are already available in digital form, each auxiliary coding device 504(.) is implemented as, for example, a memory, for example a ROM, which is addressed by the coefficients y(m).

F(5). The control circuit

Figure 7:
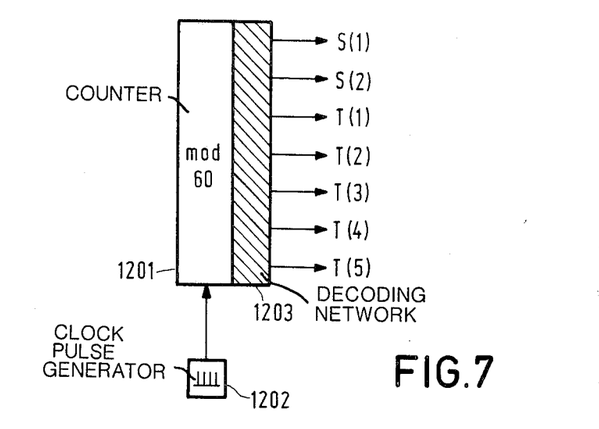
FIG. 7 shows an embodiment of a control circuit.

The clock pulses required for controlling the above-described arrangement can be obtained by means of the control circuit shown in FIG. 7. This control circuit is formed by a modulo-60 counter 1201 to which the output pulses of a clock pulse generator 1202 are applied. This generator produces clock pulses which occur at rate of, for example, 15 $f_s$. A decoding network 1203 which has seven outputs denoted S(1), S(2), T(1), T(2), T(3), T(4), T(5), respectively, is connected to this modulo-60 counter. This control circuit produces a clock pulse at its output S(1) each time the counter 1201 has one of the counting positions 0, 15, 30, 45. At its output S(2) a clock pulse occurs each time the counter 1201 has one of the counting positions 13, 28, 43 and 58. At the output T(1) a clock pulse occurs each time the counter 1201 has the counting position 59. At the output T(2) a clock pulse occurs each time the counter has one of the counting positions 0, 2, 4, 6, 8. At the output T(3) a clock pulse occurs each time the counter 1201 has one of the counting positions 1, 3, 5, 7, 9. At the output T(4) a clock pulse occurs each time the counter 1201 has the counting position 10. At the output T(5) a clock pulse occurs each time the counter 1201 has one of the counting positions 12, 27, 42, 57.

G. THE PREFERRED EMBODIMENT

As described in paragraph F(5), a clock rate which is approximately fifteen times higher than the sampling rate $f_s$, which itself is already high, is required to control the embodiment described in the preceding paragraphs. A considerably lower clock rate is required when the different elements of the coding arrangement are constructed in the manner described in the following paragraphs.

G(1). The transform arrangement

Figure 8:
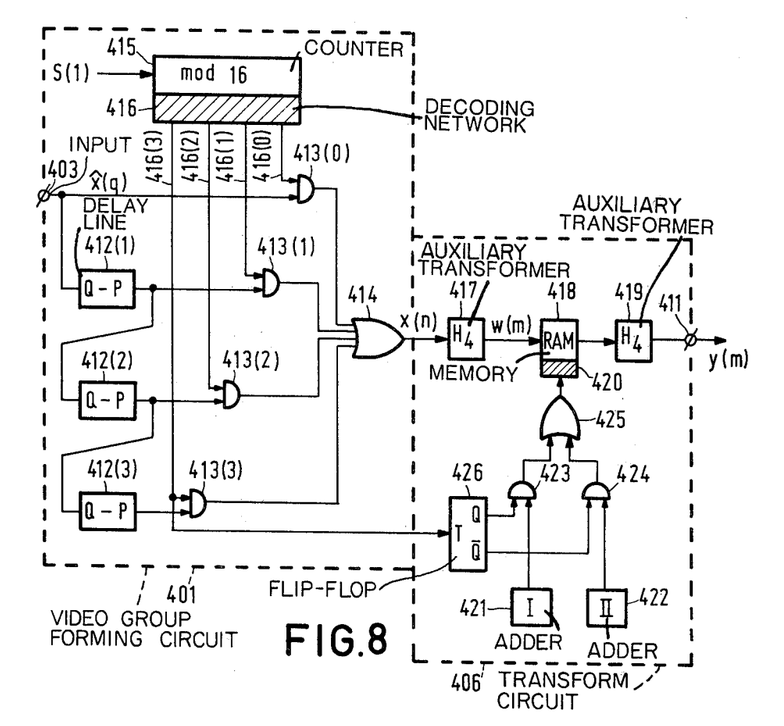
FIG. 8 shows the preferred embodiment of the transform arrangement.

FIG. 8 shows the preferred embodiment of the transform arrangement 4, with which now a $2^P \times 2^P$ Hadamard transform matrix is associated and wherein the video group consists of $2^P$ video signal samples which now however do not all belong to the same video line. More particularly, the video group is here obtained in the manner as described in Reference 7. To this end P consecutive video signal samples are taken each time from each of P consecutive video lines. Each video line must then comprise $Q = rP^2 + (P-1)P$ video signal samples. Herein the quantity r represents an integer. In the transform arrangement shown in FIG. 8, P=4, so that N=16. Also this transform arrangement comprises a video group-forming circuit 401 and a transform circuit 406. Connected to the input 403 if this circuit 401 there is now a cascade arrangement of P−1=3 delay lines 412(1), 412(2), 412(3). Each delay line has a time delay of $(Q-P)/f_s$ seconds and can accommodate Q−P video signal samples. The input 403 of this group-forming circuit and the output of each delay line are connected to an input of an OR-gate circuit 414 via a respective AND-gate circuit 413(.). In addition, P=4 control pulses are applied to each AND-gate circuit.

More particularly, four control pulses are first applied to AND-gate circuit 413(3), then four pulses to AND-gate circuit 413(2), thereafter four to AND-gate circuit 413(1) and finally four to AND-gate circuit 413(0).

The control pulses are generated by a modulo-16 counter 415, to which the sampling pulses S(1) are applied. A decoding network 416 having P=4 outputs 416(.), which are each connected to an input of an AND-gate circuit 413(.) is further connected to this counter. This decoding network 416 produces a logic "1" at its output 416(3), each time the counter has one of the counting positions 0, 1, 2 or 3. A logic "1" occurs at the output 416(2) each time the counter has one of the counting positions 4, 5, 6 or 7. A logic "1" occurs at the output 416(1) each time the counter has one of the counting positions 8, 9, 10 or 11, while a logic "1" occurs at the output 416(0) each time the counter has one of the counting positions 12, 13, 14 or 15.

The video signal samples x(n) of the video group now occur sequentially at the output of the OR-gate circuit 414 and they are applied to the transform circuit 406 which is now formed by a cascade arrangement of a first auxiliary transformer 417, a memory 418 and a second auxiliary transformer 419. These auxiliary transformers are of a similar construction, and an embodiment thereof will be described with reference to FIG. 9. It should, however, here be noted that a P×P matrix is associated with each one of these auxiliary transformers, a 4×4 Hadamard matrix in particular.

The memory 418 may be a RAM and is used to store the transformed video signal samples w(m) produced by the auxiliary transformer 417, Addressing of this memory 418 is carried out in such manner that the transformed video signal samples w(m) stored therein are read out in a sequence which differs from the sequence in which they are entered. To this end the address codes produced by either a first address generator 421 or a second address generator 422 are applied to the address decoder 420 of this memory. To this end, each one of these address generators 421, 422 is connected to the input of the address decoder 420 via an AND-gate circuit 423 and 424, respectively, and an OR-gate circuit 425. To each of the AND-gate circuits 423, 424 a control signal is applied which is generated by a T-flipflop 426 to which the output pulses of the decoding network 416 are applied. The transformed video signal samples read from the store 418 are applied to the auxiliary transformer 419 which produces the coefficients y(m) sequentially and at a rate $f_s$.

As is apparent from the foregoing, in this transform arrangement, which is shown in FIG. 8, the $P^2=16$ video signal samples of the video group are not directly subjected to a sixteen-point transformation but to an equivalent thereof. To this end the video signal samples x(1), x(2), x(3) and x(4) which are sequentially produced by the AND-gate circuit 413(3) are considered as the elements of the first row of a matrix X. The video signal samples x(5), x(6), x(7) and x(8) which are sequentially produced by the AND-gate circuit 413(2) are considered to be the elements of the second row of the matrix X. In a similar manner the video signal samples which are sequentially produced by the AND-gate circuits 413(1) and 413(0) are considered to be the elements of the third and the fourth row, respectively, of the matrix X. In the auxiliary transformer 417 this matrix X is multiplied by the 4×4 Hadamard matrix $H_4$, which results in the 4×4 matrix W having the elements w(m), in such manner that it holds that $$W = XH_4.$$

In order to obtain the desired coefficients y(m) while again using the matrix $H_4$, the matrix W must first be transposed. This is realized by means of the memory 418 and the two address generators 421 and 422. When now the transposed matrix $W_T$ is multiplied by $H_4$, a 4×4 matrix Y is obtained in such manner that:

$$Y = W^T H_4$$

the elements of which are the desired coefficients.

Figure 9:
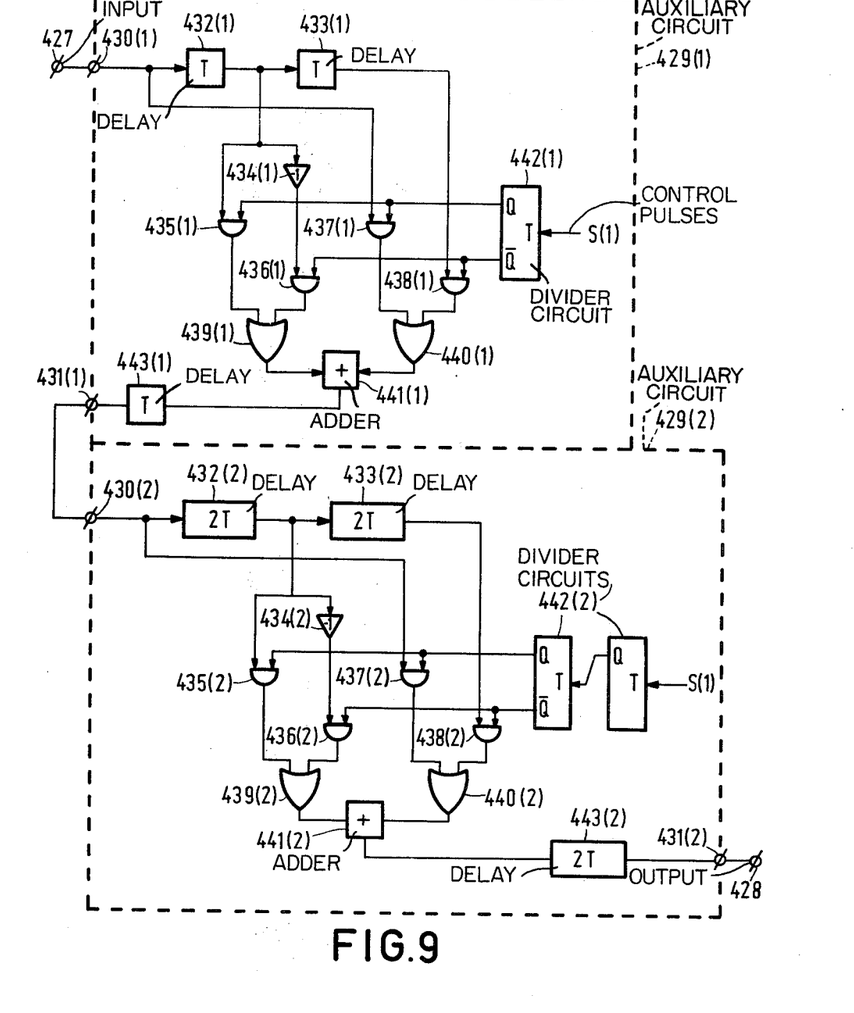
FIG. 9 shows an embodiment of an auxiliary transformer.

FIG. 9 shows an embodiment of the auxiliary transformer. The above-mentioned Hadamard matrix $H_4$ is associated with this auxiliary transformer. It has an input 427 and an output 428. A cascade arrangement of a number of auxiliary circuits 429(.) is arranged between this input and this output. Each auxiliary circuit has an input 430(.) and an output 431(.). A cascade arrangement of two delay elements 432(.) and 433(.) is connected to the input 430(.). In the manner shown in the Figure, inputs and outputs of these delay elements 432(.) and 433(.) are connected to inputs of an adder arrangement 441(.) by means of an inverter circuit 434(.), AND-gate circuits 435(.), 436(.), 437(.) and 438(.) and OR-gate circuits 439(.) and 440(.). Control pulses derived from the sampling pulses S(1) by means of a divider circuit 442(.) are applied to the AND-gate circuits 435(.), 436(.), 437(.) and 438(.). The output of the adder arrangement 441(.) is connected to the output 431(.) of the auxiliary circuit via a delay device 443(.).

In the shown embodiment, in which the Hadamard transform matrix $H_4$ must be realized the auxiliary transform arrangement comprises two auxiliary circuits 429(1) and 429(2) and the time delay of the delay elements 432(1), 433(1), 443(1) is equal to $T=1/f_s$ and the time delay of the elements 432(2), 433(2) and 443(2) is equal to 2T. The divider circuit 442(1) divides by a factor of two and is formed by one T flip-flop. Divider circuit 442(2) divides by a factor of four and is formed by a cascade arrangement of two T-flip-flops.

If a Hadamard transform matrix $H_8$ were to be realized, it is sufficient to connect a third auxiliary circuit 429(3) to the output 431(2), the time delay of the delay elements 432(3), 433(3) and 443(3) then being equal to 4T. The divider circuit 442(3) must then divide by eight and may be formed by a cascade arrangement of three T-flip-flops.

G(2). The comparison and classification circuit

The classification elements a(j,m) of the classification group A(J) are preferably chosen in such manner that $$a(j,m) = \alpha a(j-1, m) \text{ for } j = 2,3,\ldots M-1$$

$$a(M,m) = a(M,m) \quad m = 1,2,3,\ldots N$$

$$a(1,m) = 2^{d_m+1}$$

Herein $d_m$ represents a positive integer and $\alpha$ a positive number. Preferably also $\alpha=2$. On the basis of these assumptions it now follows that:

$$a(j,m) = 2^{d_m+j}$$

For a coefficient y(m) it can now be written:

$$|y(m)| = \sum_{k=0}^{K} y_k(m)2^k \text{ wherein } y_k(m) = \begin{cases} 0 \\ 1 \end{cases}$$

When now $y_k(m)=0$ for $k \geq q_m$ then it holds that:

$$|y(m)| = 2^{q_m-1} + \text{Residue when } q_m \geq 0$$

$$y(m) = 0 \quad \text{when } q_m = 0$$

For this is also hold that: $0 \leq \text{Residue} < 2^{q_m-1}$ so that when $q_m \geq 1$, then $2^{q_m-1} \leq |y(m)| < 2^{q_m}$ In the comparison and classification arrangement 6 that value of j is now determined for which it holds that:

$$2^{q_m-1} \leq |y(m)| < a(j,m) = 2^{d_m+j}$$

For this may be written:

$$2^{q_m} \leq 2^{d_m+j}$$

so that: $q_m - d_m \leq j$. This means: determine the difference between $q_m$ and $d_m$ and take for j the first integer which is greater than or equal to this difference.

In a practical embodiment in which N=16 and M=4 the following numbers were chosen for $d_m$

| | | | |
|---|---|---|---|
| $d_1 = 10$ | $d_5 = 6$ | $d_9 = 7$ | $d_{13} = 6$ |
| $d_2 = 6$ | $d_6 = 5$ | $d_{10} = 5$ | $d_{14} = 5$ |
| $d_3 = 7$ | $d_7 = 5$ | $d_{11} = 6$ | $d_{15} = 5$ |
| $d_4 = 6$ | $d_8 = 5$ | $d_{12} = 5$ | $d_{16} = 5$ |

Figure 10:
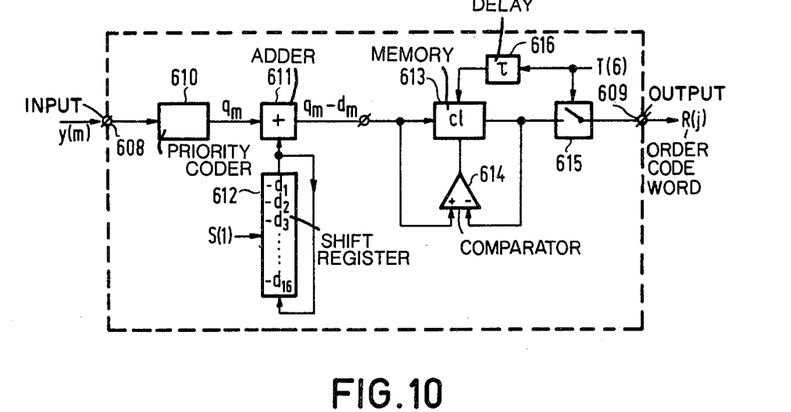
FIG. 10 shows the preferred embodiment of the comparison and classification circuit.

FIG. 10 shows an embodiment of the comparison and classification circuit 6 which has been implemented on the basis of the above-described theory. This circuit has an input 608 and an output 609. A priority coding arrangement 610 which each time produces the number $q_m$ associated with the coefficient y(m) is connected to the input. Such a coding arrangement is described in Reference 6. This number $q_m$ is applied to an adder arrangement 611 to which also the numbers $-d_m$ are applied and which thus produces the difference numbers $q_m - d_m$. The numbers $-d_m$ have been stored in the elements of a circulating shift register 612 to which the sampling signal S(1) is applied as the shift pulse signal.

In order to determine the order j, the difference number $q_m - d_m$ is applied to a memory 613 and to a comparison circuit 614. In this comparison circuit 614 the content of the memory 613 is compared with the difference number $q_m - d_m$. Each time this difference number is greater than the content of the memory the comparison circuit 614 produces a pulse in response to which the content of the memory 613 is replaced by the difference number applied to it.

After each occurrence of a sequence of sixteen sampling pulses, the content of the memory is applied as the order code word R(j) to the output 509 and this memory is thereafter cleared. This is symbolically shown in FIG. 10 by a switch 615 to which after every sixteen sampling pulses a clock pulse T(6) is applied, this clock pulse also being applied to the "clear"-input of the memory 613 via a delay element 616.

The said clock pulse T(6) may, for example, be produced by the modulo-16-counter 415, shown in FIG. 8, which by way of its decoding network 416 each time produces an output pulse at a separate output (not shown), when this counter assumes the counting position 0.

G(3). Scaling

In order to prevent the necessity that the different auxiliary coding arrangements 504(.) used in the variable word length coding arrangement 5 of FIG. 6 must have a different dynamic range this coding arrangement 5 is in practice often preceded by a multiplying arrangement by means of which the coefficients y(m) are scaled with a suitably chosen scaling or multiplying factor before they are applied to the coding arrangement 5. This scaling factor is preferably chosen equal to $2^{c(j,m)}$ in such manner, that:

$$2^{c(j,m)} = U/a(j,m)$$

Herein, U represents the maximum value which y(m) can assume.

Figure 11:
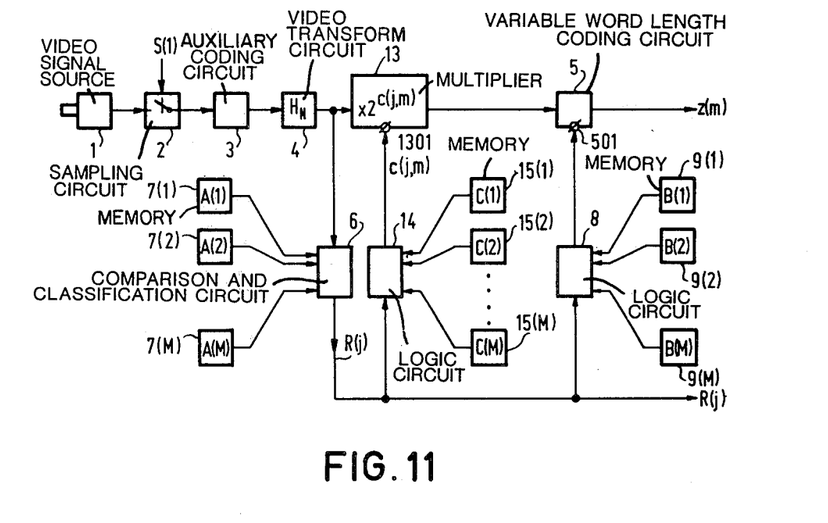
FIG. 11 shows an extension of the coding arrangement shown in FIG. 1.

This scaling can be realized in a simple way by introducing M scaling groups C(j) and by associating a scaling group C(j) with each bit-assignment group B(j). All this is schematically shown in FIG. 11. The coding arrangement shown in FIG. 11 largely corresponds to the coding arrangement shown in FIG. 1, the difference being that a multiplier 13 is included between the transform arrangement 4 and the variable word length coding arrangement 5. This multiplier has a control input 1301 which is connected to the output of a logic circuit 14, which is of a similar construction as the logic circuit 8 and to which also the order code words R(j) are applied. Also connected to this logic circuit are M memories 15(1), 15(2), ... 15(M) which may be of an identical construction as the memories 9(.). As shown in the Figure, the memory 15(1) contains the scaling group C(1), the memory 15(2) contains the scaling group C(2), etc.

H. FINAL REMARKS

I. FIG. 8 shows an embodiment of a group-forming circuit 401 in the transform arrangement 4 in which a video group is formed consisting of each time four video signal samples of four consecutive video lines. A video group may alternatively be assumed to consist of a group of 16 video signal samples each consisting of two video signal samples of a first and a fourth line of four consecutive video lines and of six video signal samples of a second and a third line of these four consecutive video lines. However, when a video group is of such a construction, each video line must comprise $Q_1 = 16r + 10$ video signal samples. As in the foregoing r also now represents a positive integer.

Figure 12:
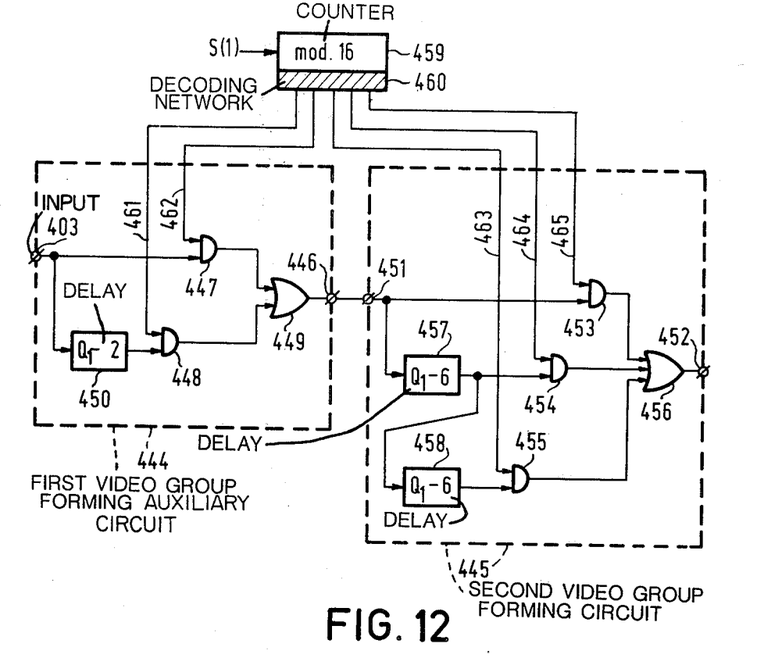
FIG. 12 shows a further embodiment of the group-forming circuit for use in the transform arrangement of FIG. 8.

An embodiment of such a video group-forming circuit 401 is shown in FIG. 12. It comprises a first and a second video group-forming auxiliary circuit 444 and 445, respectively.

This first auxiliary circuit 444 has an input 403 and an output 446 and is further formed in the manner, shown in the Figure, by AND gate circuits 447, 448, an OR-gate circuit 449 and a delay line 450. This delay line 450 has a time delay $(Q_1-2)/f_s$ and accommodates $Q_1-2$ video signal samples.

The second auxiliary circuit 445 has an input 451 and an output 452 and is further formed by three AND-gate circuits 453, 454 and 455, an OR-gate circuit 456 and two delay lines 457 and 458. Each one of these delay lines has a time delay $(Q_1-6)/f_s$ and accommodates $Q_1-6$ video signal samples.

The AND-gate circuit 447, 448, 453, 454, 455 are controlled by clock pulses which are generated by means of a modulo-16 counter 459, to which a decoding network 460 is connected. This network 460 has five outputs 461, 462, 463, 464, 465, which are connected to an input of AND-gate circuits 448, 447, 455, 454, 453, respectively. The sampling pulses S(1) are applied to this counter 459. In response to these pulses, the decoding network 460 produces a logic "1" at its output 461 each time the counter 459 has one of the counting positions 0, 1, 4, 5, 8, 9, 12, 13. A logic "1" is produced at the output 462 each time counter 459 has one of the counting positions 2, 3, 6, 7, 10, 11, 14, 15. For each of the counting positions 0, 1, 2, 3, 12, 13, 14, 15 a logic "1" occurs at output 463 and for each counting position 4, 5, 6, 7 a logic "1" occurs at the output 464. Finally, a logic "1" occurs at the output 465 when counter 459 has one of the counting positions 8, 9, 10 or 11.

If this video group-forming circuit is intended for use in the coding arrangement, then the input 451 of the second auxiliary circuit 445 is connected in the manner shown in the Figure to the output 446 of the first auxiliary circuit 444. If, on the contrary, this video group-forming circuit is intended for use in a decoder arrangement then the input 403 of the first auxiliary circuit 444 must be connected to the output 452 of the second auxiliary circuit.

Figure 13:
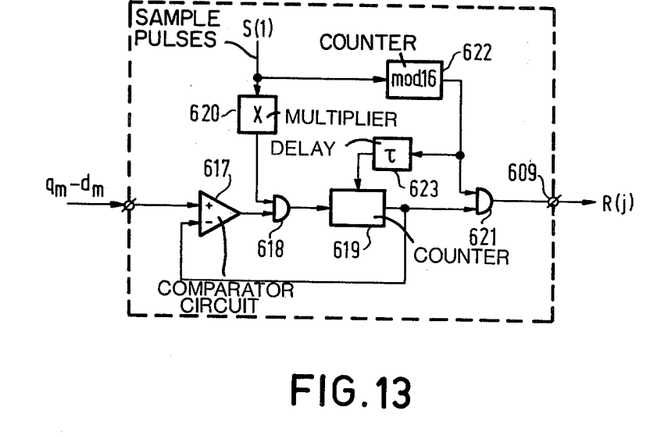
FIG. 13 shows an alternative embodiment of the circuit used for generating the order-code word R(j) in the comparison and classification circuit.

II. In FIG. 10 a memory in which the difference number $q_m - d_m$ is stored is used to determine the order code word R(j). The circuit shown in FIG. 13 may alternatively be used for this purpose. Herein the difference number $q_m - d_m$ is again applied to a comparator circuit 617 the output of which is connected to the input of a counter 619 via an AND-gate circuit 618. The output of this counter is also connected to an input of the comparator circuit 617. As a result thereof the content of counter 619 is compared with the difference number. Clock pulses which are derived from the sampling pulses S(1) by means of a frequency multiplier 620 are also applied to this AND-gate circuit 618. Each time the difference number is greater than the content of counter 619 such number of clock pulses are applied to this counter that its content is greater than or equal to this difference number. After all sixteen difference numbers have been applied to the comparator circuit 617, the content of this counter 619 is applied as order code word R(j) to the output 609 via an AND-gate circuit 621. A modulo-16 counter 622 has been provided for this purpose, to which also the sampling pulses S(1) are applied and which applies a pulse to AND-gate circuit 621 each time the counter has a predetermined counting position. After having been delayed in a delay device 623 this pulse is also applied to couner 619, causing this counter to be set to the zero position.

III. In the practically tested preferred embodiment of the coder arrangement, M has been chosen equal to 4.

Figure 14:
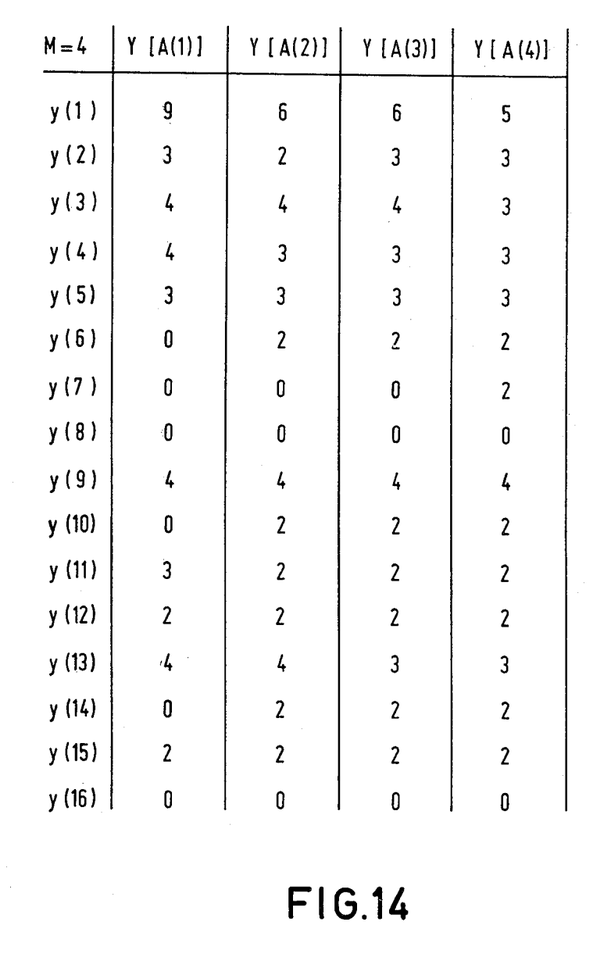
FIG. 14 shows the number of bits into which the different coefficients are encoded.

The number of bits into which the coefficients y(m) of a group of coefficients were coded is shown in the Table of FIG. 14. More in particularly, in FIG. 14 column Y [A(j)], wherein j=1,2 ... M shows the number of bits into which the corresponding coefficients must be encoded when the group of coefficients Y is smaller than the classification group A(j).

IV. It should be noted that in practice the classification group A(M) will be chosen in such manner that y(m) is always smaller than a(M,m) for all values of m. Comparing the group of coefficients with this classification group A(M) is then not necessary and this classification group may even be completely omitted. However, this does then imply that if there are coefficients y(m) which are larger then $a(M-1,m)$ that then the bit-assignment group B(M) must indeed be applied to the variable word length coding arrangement.

What is claimed is:

1. A method of digitizing a time-discrete video signal, comprising the following steps:
   (a) composing a video group consisting of a finite number of N video signal samples x(n);
   (b) transforming this video group into a group of coefficients consisting of N coefficients y(m), which are each equal to the sum of weighted versions of the video signal samples x(n) of the video group and wherein n, m = 1, 2, 3, ... N;
   (c) adaptive coding of each of the coefficients y(m) of the group of coefficients by carrying out the following sub-steps:
      c(1). comparing the absolute value of the group of coefficients with a number of classification groups A(j) wherein j = 1, 2, 3 ... M, each consisting of the positive elements a(j,m) and the order j being assigned to the group A(j) and $a(j+1,m) \geq a(j,m)$, while a bit-assignment group B(j) consisting of the positive elements b(j,m) is associated with each classification group A(j);
      c(2). determining the classification group A(j) of the least possible order for which it holds that for each value of m the absolute value of y(m) is smaller than a(j,m);
      c(3). converting the absolute value of each of the coefficients y(m) into a coefficient code word z(m) which comprises a number of bits characterized by the element b(j,m) of the bit-assignment group B(j) associated with the selected classification group A(j);
   (d) generating an order code word R(j) which characterizes the order of the selected classification group A(j).

2. An arrangement for digitizing a time-discrete video signal comprising:
   (a) means for composing a video group consisting of a finite number of N video signal samples x(n);
   (b) means for transforming this video group into a group of coefficients consisting of N coefficients y(m), which are each equal to the sum of weighted versions of the video signal samples x(n) of the video group and wherein n, m = 1, 2, 3, ... N;
   (c) means for adaptively coding each of the coefficients y(m) of the group of coefficients, comprising:
      c(1). comparison means for comparing the absolute value of the group of coefficients with a number of classification groups A(j), wherein j = 1, 2, 3, ... M, each consisting of the positive elements a(j,m) and the order j being assigned to this group A(j) and $a(j+1,m) \geq a(j,m)$, while a bit-assignment group B(j) consisting of the positive elements b(j,m) is associated with each classification group A(j);

c(2). means controlled by the said comparison means for determining that classification group A(j) of the least possible order for which it holds that for each value of m the absolute value of y(m) is smaller than a(j,m);

c(3). means controlled by the elements b(j,m) of the bit-assignment group B(j) which is associated with the selected classification group A(j), for converting the absolute value of each of the coefficients y(m) into a coefficient code word z(m) which comprises a number of bits characterized by the element b(j,m);

(d) means for generating an order-code word R(j) which characterizes the order of the selected classification group A(j).

3. An arrangement as claimed in claim 2, in which the said transforming means comprises a first and a second auxiliary transformer, the output of the first auxiliary transformer being connected to the input of the second auxiliary transformer via a transposing circuit.

4. An arrangement as claimed in claim 3, in which each auxiliary transformer is formed by a cascade arrangement of a number of auxiliary circuits, each comprising a cascade circuit of a number of delay lines the inputs and the outputs of which are connected to the inputs of an adder device by means of a switching arrangement controlled by a clock signal.

5. An arrangement as claimed in any one of claims 2 to 4, in which the said comparison means comprises a priority encoding arrangement, as well as a memory for generating a number of N numbers $d_m$ wherein M=1, 2, ... N, and adder means coupled to both the output of the priority encoding arrangement and the output of the memory.

6. An arrangement as claimed in claim 5 in which for determining the classification group the output of the comparison means is connected to the input of a memory and to a first input of a comparison circuit to which also the contents of the memory is applied and the output of which is connected to the write input of the memory.

7. An arrangement as claimed in claim 2 in which for determining the classification group the output of the comparison means is connected to the input of a memory and to a first input of a comparison circuit to which also the contents of the memory is applied and the output of which is connected to the write input of the memory.

* * * * *